(12) United States Patent
Moon et al.

(10) Patent No.: US 8,532,035 B2
(45) Date of Patent: Sep. 10, 2013

(54) METHOD FOR RESOURCE PARTITIONING WITH PREDEFINED PATTERN AND ADAPTIVE RESOURCE PARTITIONING METHOD

(75) Inventors: Sung Ho Moon, Anyang-Si (KR); Min Seok Oh, Anyang-Si (KR); Jin Young Chun, Anyang-Si (KR); Ki Ho Nam, Anyang-Si (KR); Jin Sam Kwak, Anyang-Si (KR); Min Seok Noh, Anyang-Si (KR); Yeong Hyeon Kwon, Anyang-Si (KR); Hyun Woo Lee, Anyang-Si (KR); Dong Cheol Kim, Anyang-Si (KR); Bin Chul Ihm, Anyang-Si (KR); Seung Hee Han, Anyang-Si (KR); Sung Gu Cho, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 761 days.

(21) Appl. No.: 12/344,061

(22) Filed: Dec. 24, 2008

(65) Prior Publication Data
US 2009/0168716 A1 Jul. 2, 2009

(30) Foreign Application Priority Data
Dec. 28, 2007 (KR) .................. 10-2007-0140130

(51) Int. Cl.
*H04W 4/00* (2009.01)
(52) U.S. Cl.
USPC ........................ 370/329; 370/312; 455/454
(58) Field of Classification Search
USPC .................. 370/329, 312; 455/454
See application file for complete search history.

(56) References Cited

U.S. PATENT DOCUMENTS

| 2005/0058089 | A1* | 3/2005 | Vijayan et al. ............... 370/312 |
| 2008/0176577 | A1* | 7/2008 | Bourlas et al. ............... 455/454 |
| 2008/0186935 | A1* | 8/2008 | Ling et al. ................... 370/342 |
| 2010/0220668 | A1* | 9/2010 | Yamada et al. .............. 370/329 |

FOREIGN PATENT DOCUMENTS

| KR | 10-2005-0122793 A | 12/2001 |
| KR | 10-2006-0004142 A | 10/2006 |
| KR | 10-2007-0023485 A | 2/2007 |
| KR | 10-2007-0051675 A | 5/2007 |

* cited by examiner

*Primary Examiner* — Pao Sinkantarakorn
*Assistant Examiner* — Richard K Chang
(74) *Attorney, Agent, or Firm* — Birch, Stewart, Kolasch & Birch, LLP

(57) ABSTRACT

An adaptive resource partitioning method includes: selecting a predefined pattern-based partitioning method or an informed map-based partitioning method according to the number of channels used for resource allocation, data characteristics, and a channel environment variation, if the predefined pattern scheme is selected, selecting any of predefined patterns, partitioning distributed and localized resource allocation areas according to the selected pattern, and transmitting a pattern index of the selected pattern to a terminal, and if the informed map scheme is selected, partitioning distributed and localized resource allocation areas according to an arbitrary pattern, and transmitting bitmap control information indicating information of the partitioned areas to the terminal. So, it effectively obtains a diversity and a scheduling gain when distributed and localized resource allocations are simultaneously used, such that it increases flexibility of resource allocation, increases an available data transfer rate, and reduces an amount of necessary control information.

6 Claims, 10 Drawing Sheets

$(N_f/2 : N_f/2)$ $(2:2)$ (1:1)

(3:1)

METHOD FOR RESOURCE PARTITIONING WITH PREDEFINED PATTERN AND ADAPTIVE RESOURCE PARTITIONING METHOD

This application claims the benefit of the Korean Patent Application No. 102007-0140130, filed on Dec. 28, 2008, which is hereby incorporated by reference as if fully set forth herein.

BACKGROUND OF THE INVENTION

1. Field of the Invention

The present invention relates to an Orthogonal Frequency Division Multiple Access (OFDMA), and more particularly to a predefined pattern-based resource partitioning method for partitioning a resource area, a resource partitioning method based on an informed map, and an adaptive resource partitioning method.

2. Discussion of the Related Art

Generally, in order to maximize efficiency of limited radio resources in a broadband communication system, a variety of transmission/reception techniques and usage methods, which are more effective in time, space, and frequency domains, have been proposed in the broadband communication system. Specifically, a multicarrier-based orthogonal frequency division multiplexing (OFDM) scheme reduces the complexity of a reception end under a frequency selective fading environment generated from a broadband channel, performs selective scheduling in a frequency domain using different channel characteristics of subcarriers, such that a spectral efficiency can be maximized. Also, the multicarrier-based OFDM scheme can be extended to an OFDMA scheme by assigning different subcarriers to multiple users, such that many developers are conducting intensive research into this multicarrier-based OFDM scheme to increase the efficiency of radio resources in the frequency domain. The IEEE 802.16-2004 and IEEE 802316e-2005 modified standards (hereinafter referred to as 'IEEE 802.16') have been completed as a WirelessMAN-OFDMA standard based on a representative OFDMA scheme.

A logical frame structure of an IEEE 802.16e system includes a preamble, a frame control header (FCH), and a control signal part and data bursts of a DL/UL-MAP, as shown in FIG. 1. Data transmission of each user may be defined by different subcarrier allocation schemes (e.g., PUSC, (O-)FUSC, TUSC, AMC) according to subchannel construction methods. These subcarrier allocation methods can be generally classified into two types, i.e., a distributed method and a localized method. This distributed method allocates subcarriers according to a pattern pre-engaged between a transmitter and a receiver. This localized method allocates an optimized subcarrier area on the basis of feedback information of the receiver at each resource allocation time. The PUSC, (O-)FUSC, or TUSC method corresponds to the distributed method, and the AMC method corresponds to a localized method. In case of the IEEE 802.16e system, a variety of permutation zones may be constructed in a single frame.

FIG. 2 is a conceptual diagram illustrating a method for constructing various zones and transmitting them. Each terminal performs channel estimation, a synchronization process, and a cell ID acquisition process using the preamble, and then receives channel allocation information associated with a DL-MAP and channel code information via the FCH zone. Based on the channel allocation information and the channel code information, regions of each zone and a permutation method of each zone can be allocated via the DL/UL-MAP. If the zone allocation is not newly changed to another, a current zone structure is retrieved, and only one of the above-mentioned different subcarrier allocation methods is selected within a single zone, such that radio resources are allocated to each channel. Therefore, transmission of additional control information for constructing each frame zone is unnecessary.

The partitioning of the distributed resource area and the localized resource area under the IEEE 802.16e frame structure is carried out on the basis of a zone. Only one of two resource allocation methods should be used within only one zone. The above-mentioned method has a limitation in time, such that a method for using areas of two resource allocation methods in different ways is advantageous to the reduction of control signals. However, the above-mentioned method has the limitation in time, such that the allocation of selectable distributed or localized resource areas may be restricted. As a result, a data throughput of the localized resource allocation area may be decreased, or an available diversity for the distributed resource area may also be decreased.

On the other hand, provided that two resource allocation methods can be simultaneously used in only one scheduling area, a location and amount of localizably-allocated resources for each scheduling may be changed to another location and amount, such that the changed location and amount may unavoidably affect the distributedly-allocated resource area. Therefore, in order to allow two resource allocation methods to be used in only one scheduling area, there is needed a method for informing a receiver of a localized allocation area by a current scheduling process every scheduling time, and this method must also inform the receiver of a specific area capable of being used as a distributed resource area.

The above-mentioned information is equal to control information generated in a common control signal (e.g., a preamble or FCH) at each additional scheduling, such that it encounters a waste of radio resources to be allocated to data, resulting in a deterioration of a data transfer rate.

SUMMARY OF THE INVENTION

Accordingly, the present invention is directed to a method for resource partitioning with a predefined pattern, and an adaptive resource partitioning method, that substantially obviates one or more problems due to limitations and disadvantages of the related art.

An object of the present invention is to provide a partitioning method of a resource area, such that localized resource allocation and distributed resource allocation can be properly matched with each other.

Another object of the present invention is to provide a predefined pattern-based resource partitioning method capable of reducing an amount of necessary control information.

Another object of the present invention is to provide an adaptive resource partitioning method for adjusting a resource partitioning method according to a situation change, thereby increasing a diversity gain or a data transfer rate.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a predefined pattern scheme-based resource partitioning method for a method for partitioning resources for use in localized allocation and distributed allocation in a downlink transmission system based on an orthogonal frequency division multiple access (OFDMA) includes: selecting any one of predefined patterns, partitioning a distributed resource allocation area and a localized resource allocation area according to the selected pattern, and scheduling the partitioned resource allocation areas; and transmitting a pattern index of the selected pattern to a terminal.

The predefined patterns may include ratio information for arranging the distributed resource allocation area and the localized resource allocation area on a frequency axis.

The predefined patterns may include an order of time where at least one frequency-axis pattern based on the ratio information is arranged on a time axis.

In another aspect of the present invention, a method for adaptively partitioning resources for use in localized allocation and distributed allocation in a downlink transmission system based on an orthogonal frequency division multiple access (OFDMA) includes: selecting any one of predefined patterns according to at least one of the number of channels used for resource allocation, data characteristics, and a channel environment variation; partitioning a distributed resource allocation area and a localized resource allocation area according to the selected pattern, and scheduling the partitioned resource allocation areas; and transmitting a pattern index of the selected pattern to a terminal.

The selecting of the pattern may include selecting any one of the predefined patterns according to the number of channels used for the localized allocation and the number of channels used for the distributed allocation.

The selecting of the pattern may include selecting any one of the predefined patterns according to a bandwidth requested by data to be transmitted and a connection persistency.

The selecting of the pattern may include selecting any one of the predefined patterns according to a channel selectivity on a time axis and a channel selectivity on a frequency axis.

In another aspect of the present invention, a method for adaptively partitioning resources for use in localized allocation and distributed allocation in a downlink transmission system based on an orthogonal frequency division multiple access (OFDMA) includes: selecting either a predefined pattern scheme-based partitioning method or an informed map scheme-based partitioning method according to at least one of the number of channels used for resource allocation, data characteristics, and a channel environment variation; if the predefined pattern scheme is selected, selecting any one of predefined patterns, partitioning a distributed resource allocation area and a localized resource allocation area according to the selected pattern, and transmitting a pattern index of the selected pattern to a terminal; and if the informed map scheme is selected, partitioning a distributed resource allocation area and a localized resource allocation area according to an arbitrary pattern, and transmitting bitmap control information indicating information of the partitioned areas to the terminal.

The selecting of the partitioning method may include selecting either one of the partitioning methods according to the number of channels used for the localized allocation and the number of channels used for the distributed allocation.

The selecting of the partitioning method may include selecting either one of the partitioning methods according to a bandwidth requested by data to be transmitted and a connection persistency.

The selecting of the partitioning method may include selecting either one of the partitioning methods according to a channel selectivity on a time axis and a channel selectivity on a frequency axis.

In conclusion, the present invention effectively obtains a diversity and a scheduling gain when distributed resource allocation and localized resource allocation are simultaneously used, such that it increases flexibility of resource allocation, increases an available data transfer rate, and reduces an amount of necessary control information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The following embodiments of the present invention may be modified into various formats, and the scope of the present invention is not limited to only the following embodiments and can also be applied to other examples.

A distributed resource allocation method allows a physical mapping result of data to be loaded on carriers spaced apart from each other on a frequency axis, and transfers the physical mapping result via the carriers, such that it acquires a diversity gain on a frequency axis. In the meantime, a localized resource allocation method selects a bundle of carriers of the best frequency axis at a current time on the basis of feedback channel information of a receiver, and transmits the selected bundle of carriers, such that it acquires a gain based on a scheduling.

Figure 1:
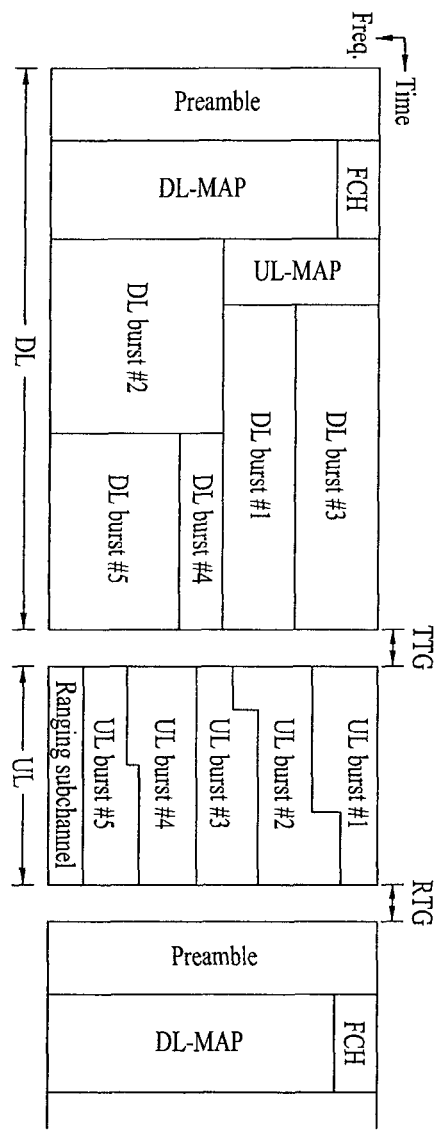
FIG. 1 shows a logical frame structure of an IEEE 802.16e under a TDD mode.
Figure 2:
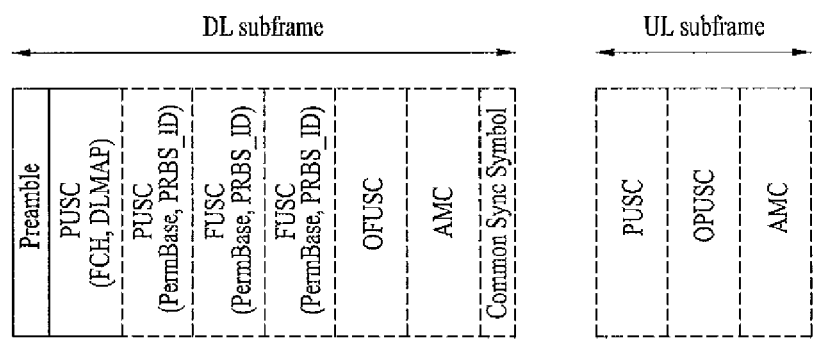
FIG. 2 exemplarily shows several partitioned zones of the frame structure of FIG. 1.
Figure 3:
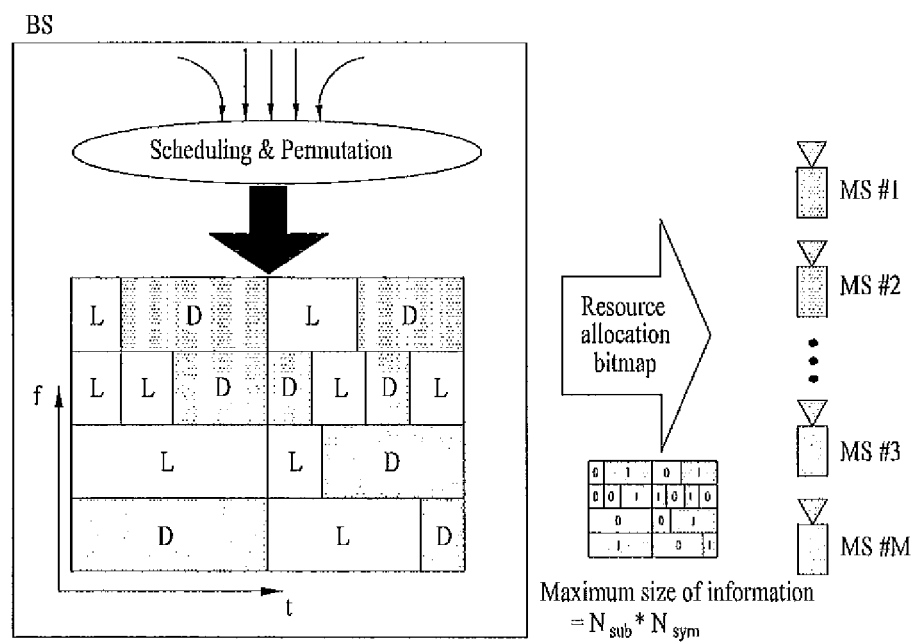
FIG. 3 is a conceptual diagram illustrating a resource partitioning method based on an informed map.

FIG. 3 is a conceptual diagram illustrating a resource partitioning method based on an informed map.

The method of FIG. 3 allows a scheduler to freely allocate resources to an arbitrary channel using all of time and frequency domains within a single scheduling area, and informs each receiver of the allocated result according to a bitmap format or a compressed bitmap format, such that it implements the best degree of freedom. This method must inform all reception terminals of allocated distributed- and localized-resource allocation areas for each scheduling, such that an amount of control information unavoidably increases. For example, provided that N_sub is the number of subcarriers, N_sym is the number of OFDM signals in a single scheduling area, and the localized allocation method performs resource allocation on the basis of a subcarrier and an OFDM symbol, additional bitmap control information having a maximum of N_sub*N_sym bits must be notified to receivers every scheduling time.

In order to reduce an amount of overhead of control information, the above-mentioned informed map scheme may include a variety of resource allocation methods, for example, a use of offset information or allocation of area information.

Figure 4:
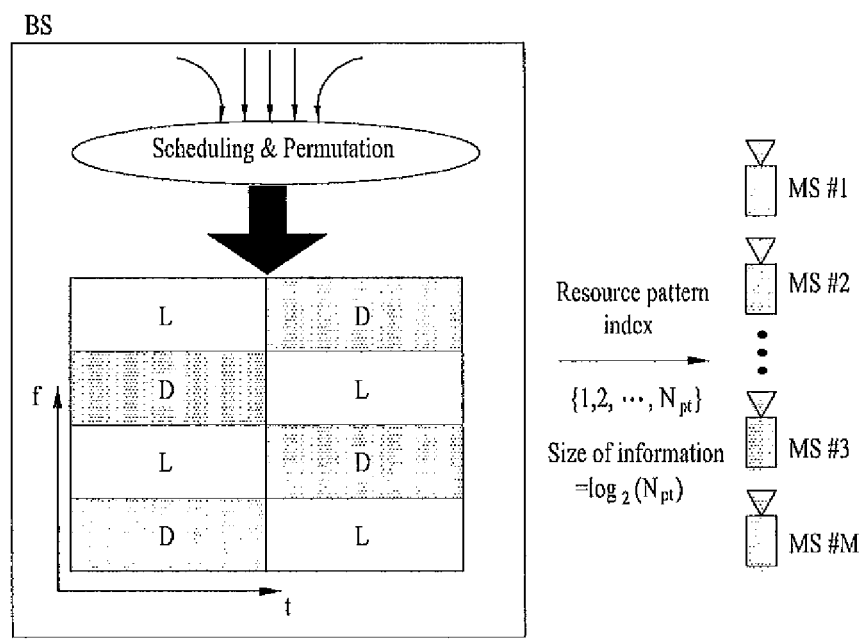
FIG. 4 is a conceptual diagram illustrating a resource partitioning method based on an informed map.

FIG. 4 is a conceptual diagram illustrating a resource partitioning method based on an informed map.

Referring to FIG. 4, another method for reducing the overhead using the informed map partitions a distributed- or a localized resource allocation method for each scheduling according to a predefined pattern, and informs only index information of this pattern. According to the above-mentioned method, the number of predefined patterns is limited, such that an amount of additional control information signals which must be notified from a transmitter to a receiver can be greatly reduced. However, the degree of the partitioning of the allocation area is decreased as much as the decreased control information, such that the obtaining of available diversity is limited, resulting in a reduction of a transfer rate.

Figure 5:
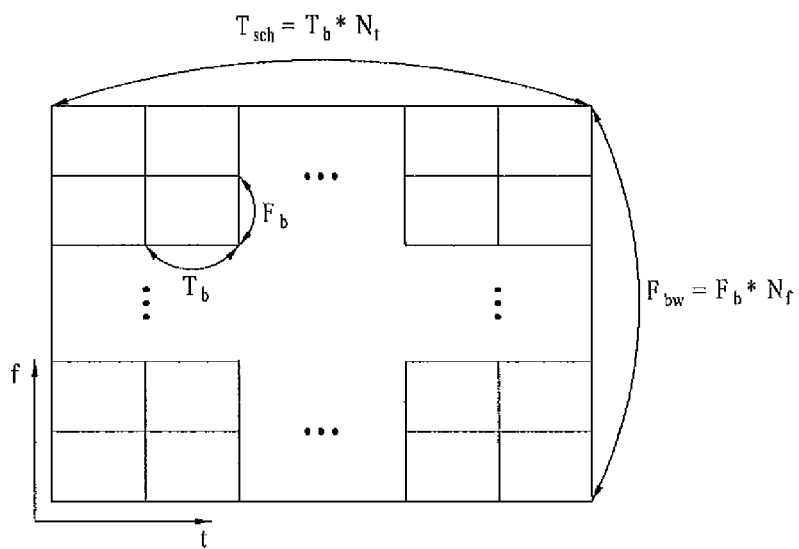
FIG. 5 is a conceptual diagram illustrating a method for partitioning a unit allocation area according to the present invention.

FIG. 5 is a conceptual diagram illustrating a method for partitioning a unit allocation area according to the present invention.

In FIG. 5, a minimum unit on a frequency axis is set to a subcarrier, and a maximum unit on the same frequency axis is set to a total bandwidth. A minimum unit on a time axis is set to an OFDM symbol, and a maximum unit on the same time axis is set to a single scheduling period. A subcarrier interval on the frequency axis is represented by $F_s$(Hz), and an OFDM symbol interval on the time axis is represented by $T_s$(S). The size of a unit allocation area has a specific time denoted by $T_b$(s) on a time axis, and has a bandwidth denoted by $F_b$(Hz) on a frequency axis. In this case, $N_t$ and $N_f$ are integers indicating the number of unit allocation areas based on $F_b$ and $T_b$ sizes. If a scheduling area on the time axis is represented by $T_{sch}$ and a transmission band contained in a transmission system on the frequency axis is represented by $F_{bw}$, the following equations 1 and 2 can be acquired.

$$T_{sch} = N_t \times T_b \quad \text{[Equation 1]}$$

$$F_{bw} = N_f \times F_b \quad \text{[Equation 2]}$$

A pattern generation method for use in the predetermined pattern scheme can be classified according to a frequency axis and a time axis.

For example, all areas may be used for the distributed allocation method, or may also be used for the localized allocation method. This method may be equal to a method for allocating resource areas on the frequency axis by the conventional IEEE 802.16e system. For another example, $F_b$ is divided into several parts in $F_s$ units, and the divided result may be alternately applied to the localized allocation method and the distributed allocation method in such a way that the resource area can be allocated. It is determined that which one of the distributed allocation method and the localized allocation method is applied to each $F_b$-unit allocation area, such that a variety of pattern formats may be generated for the same $F_b$ Value. For example, provided that the distributed method is allocated to a first area having the $F_b$ size, and the localized method is allocated to two areas next to the first area, this allocation result may indicate that the size of the distributed method is different from that of the localized method. As shown in the above example, an available pattern capable of being made on the frequency axis on the basis of the $F_b$ unit includes all kinds of patterns represented by the following equation 3:

Number of Patterns available for Frequency Axis,
$$C_f = 2^{N_f} \quad \text{(Equation 3)}$$

FIGS. 6 to 12 show methods for generating a pattern on a frequency axis using a predefined pattern-based resource partitioning method according to one embodiment of the present invention.

FIGS. 6 to 12 show some available patterns. In order to easily discriminate these patterns, indexes (e.g., (a:b) indexes) are used. In this case, the 'a' index represents the ratio of the frequency block number based on the distributed allocation method, and the 'b' index represents the ratio of the frequency block number based on the localized method.

Figure 6:
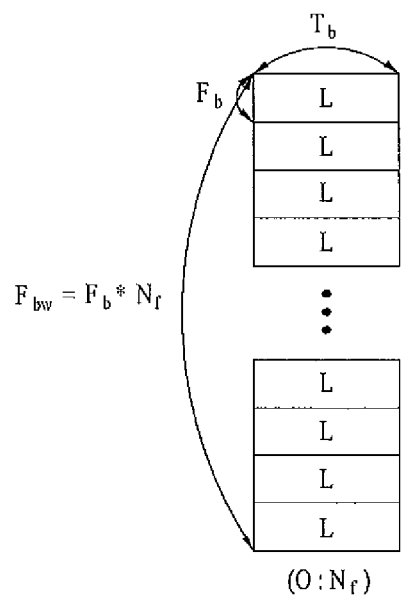
FIGS. 6 to 12 show methods for generating a pattern on a frequency axis using a predefined pattern based resource partitioning method according to one embodiment of the present invention.
Figure 7:
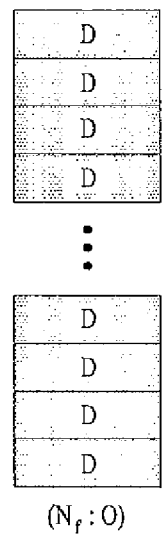

In FIG. 6, 'a' is set to '0', such that only the localized allocation exists on the frequency axis. In FIG. 7, 'b' is set to '0', such that only the distributed allocation exists on the frequency axis.

Figure 8:
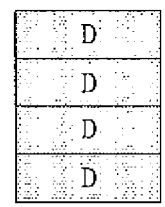
Figure 8:
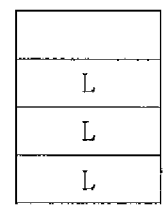
Figure 9:
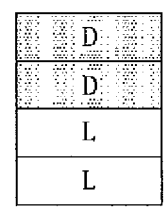
Figure 9:
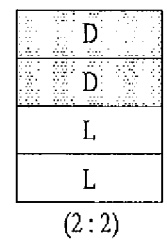
Figure 10:
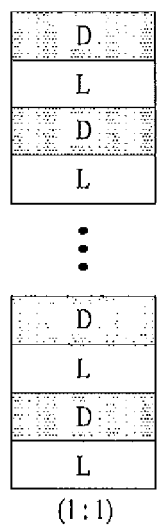

A difference among ($N_{f/2}:N_{f/2}$) of FIG. 8, (2:2) of FIG. 9, and (1:1) of FIG. 10 indicates that the ratios of the number of blocks used in FIGS. 8 to 10 are equal to each other, but the localized allocation pattern and the distributed allocation pattern which are sequentially arranged are different from each other.

Figure 11:
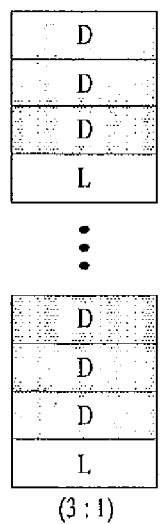
Figure 12:
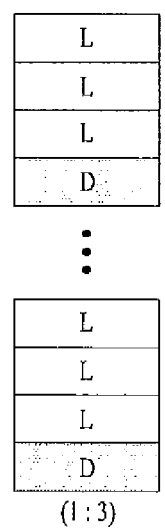

Referring to FIGS. 11 and 12, three frequency blocks based on the distributed allocation method are successively arranged, and three frequency blocks based on the localized allocation method are successively arranged.

Figure 13:
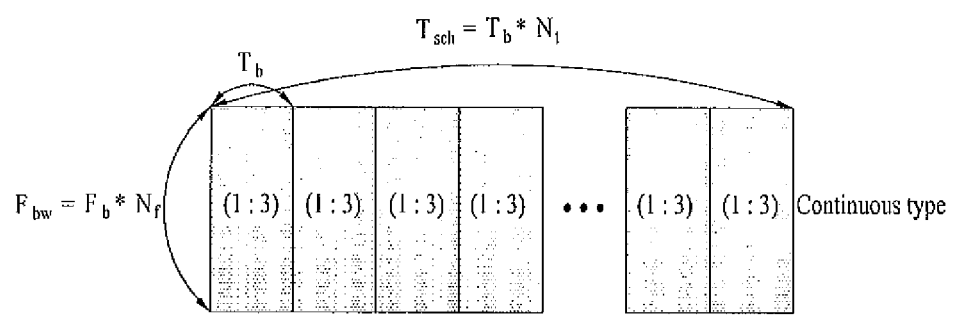
FIGS. 13 to 15 show methods for generating a pattern on a time axis using a predefined pattern-based resource partitioning method according to one embodiment of the present invention.
Figure 14:
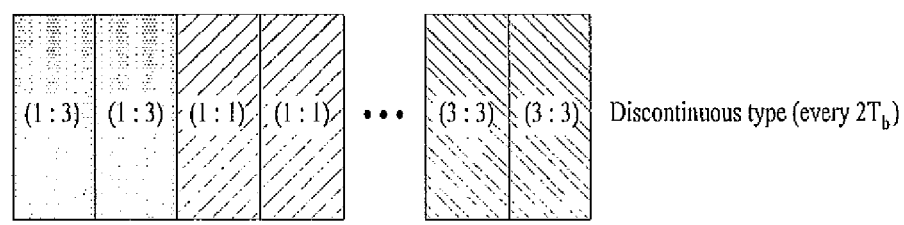
Figure 15:
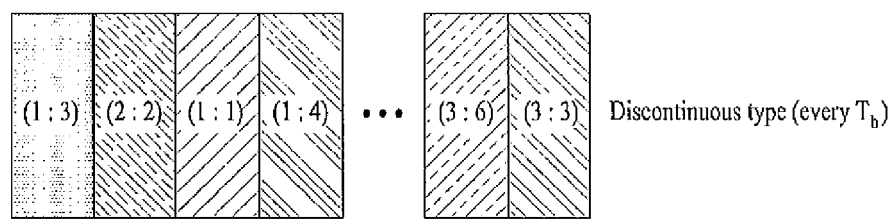

FIGS. 13 to 15 show methods for generating a pattern on a time axis using a predefined pattern-based resource partitioning method according to one embodiment of the present invention.

The pattern generation method on a time axis indicates how to arrange the pattern generated on the frequency axis. A minimum unit of the pattern on the time axis is in the range from an OFDM symbol unit to a scheduling unit area. The pattern generation method may be classified into a first method for continuously maintaining a pattern of the same frequency axis as shown in FIG. 13, and a second method for changing a frequency-axis pattern at intervals of a predetermined unit time as shown in FIGS. 14 and 15. A unit changed by the pattern is decided as a multiple of $T_b$. That is, the method of FIG. 14 changes the frequency-axis pattern in $2T_b$ units, and the method of FIG. 15 changes a frequency-axis pattern in $T_b$ units.

The embodiments of the present invention relate to all predefined patterns, each of which is made by a combination of two-axes allocation methods according to a pattern generation method on frequency and time axes.

In case of a pattern structure having the localized and distributed resource allocations, transmission of all available pattern information achieves the same overhead as that of bitmap-based resource transmission as shown in Equation 3. Therefore, the present invention effectively uses a predetermined pattern to reduce an amount of control overhead, and can transfer resource allocation information by restricting a pattern used for acquiring a throughput.

In other words, some patterns are grouped as a specific pattern among $2^{Nf}$ patterns as shown in Equation 3, such that a pattern set may be constructed. Information of patterns used in this pattern set is transferred, resulting in reduction of control overhead. For example, if an available pattern set is generated by Nf_sub patterns, control information needed for the Nf_sub patterns is reduced to $\log_2(\text{Nf\_sub})$. The available pattern set or group may be configured in the form of an arbitrary specific pattern, and may also be defined by the ratio of the localized area and the distributed area. In this case, the amount of overhead can be further reduced as compared to the aforementioned case in which the pattern set is configured by the arbitrary specific pattern.

However, in case of a specific ratio, a throughput caused by this specific ratio is affected by basic construction methods of the distributed and localized areas. Specifically, in case of the localized allocation, channel influences upon a coherence bandwidth are similar to each other, such that a coherent construction under the localized allocation may be more effective.

The reducing of overhead by either a simple ratio or a limited pattern may deteriorate resource efficiency. One or more numbers of cases considered as basic construction patterns may be determined according to the ratio of localized and distributed areas, such that the determined number of cases may be separately notified to a terminal. For example, if the ratio of the distributed allocation to the localized allocation is 1:2, a structure of (D,L,L) may be repeated, or a structure of (L,D,L) or (L,L,D) may be repeated. Generally, various structures (e.g., (D,D,L,L,L,L), (L,D,L,D,L,L)) may be constructed, and one or more construction patterns may be restricted to these structures, and the restricted result may be notified. Therefore, transmission of allocation information for the localized or distributed resource area can be implemented by the following steps.

Firstly, a basic time-frequency resource unit for the localized or distributed resource allocation is configured, control information for this time-frequency resource unit is generated and transferred. In some cases, a minimum basic unit may be established in the time-frequency area, such that information may be configured in the form of a multiple of the minimum unit, such that the configured resultant information may be configured in the time or frequency domain.

Next, localized or distributed resources are allocated in consideration of a basic time-frequency resource unit, and associated control information is generated and transferred. Localized or distributed resources may be allocated as one of predetermined pattern sets or groups based on the basic unit, may be allocated as one of restricted pattern sets made by the ratio of the localized or distributed areas, or may also be allocated as a predetermined pattern.

Finally, resources are allocated in consideration of a detailed pattern scheme, and associated control information is generated and transferred. According to a method for constructing the allocated pattern, an allocation method for applying the detailed pattern scheme may be further applied to this method. In this case, as for a pattern established in the above second process, the ratio of the localized and distributed areas may be fixed, and its construction method may also be changed to another method.

According to the embodiments of the present invention, the localized and distributed resource allocation information transmission methods allocate resources simultaneously while performing at least one of three-stage resource allocation information generation schemes, thereby generating control information.

For example, if one of a predefined pattern and an informed map may be continuously used or only one pattern of the predefined pattern is used, this method is referred to as a non-adaptive method. Also, if this combination is changed to another combination according to individual conditions, this method is referred to as an adaptive method.

Two cases (i.e., the following first and second cases) may be considered for the adaptive method. The first case adaptively changes a predefined pattern when resources are allocated by the predefined pattern scheme. The second case adaptively performs the selection between the predefined pattern scheme and the informed map scheme, such that resources can be partitioned.

Figure 16:
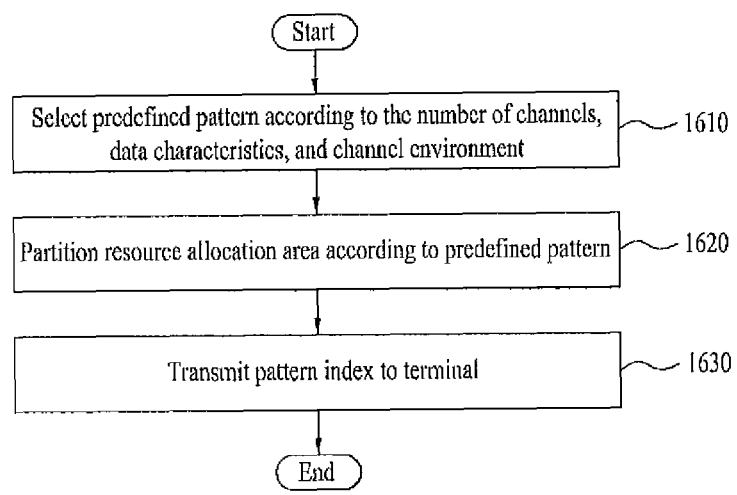
FIG. 16 is a flow chart illustrating an adaptive resource partitioning method according to the present invention.

FIG. 16 shows the first case of the above-mentioned adaptive resource partitioning method. In more detail, FIG. 16 is a flow chart illustrating an adaptive resource partitioning method according to the present invention.

In FIG. 16, a system according to the present invention selects any one of predefined patterns according to at least one of the number of channels used for resource allocation, data characteristics, and a channel environment variation at step 1610.

Next, the system discriminates between the distributed resource allocation area and the localized resource allocation area according to the selected pattern, and performs scheduling on the discriminated result at step 1620.

Finally, a pattern index of the selected pattern is transferred to the terminal at step S1630.

In this case, a method for selecting the predefined pattern may include a first method for changing the predefined partitioning pattern according to the number of distributed and localized allocation channels, a second method for changing the predefined partitioning pattern according to characteristics of transmission (Tx) data, a third method for changing the predefined partitioning pattern according to frequency-axis channel selectivity, and a fourth method for changing the predefined partitioning pattern according to time-axis channel selectivity.

Under the condition that there are many channels to be used for the localized allocation, if patterns used for this allocation have a higher ratio in the distributed allocation than the localized allocation, a channel desiring to use the localized allocation may be delayed and scheduled, and time- or frequency-domain resources having poor channel characteristics may be selectively transferred, such that a data transfer rate may be deteriorated. Therefore, the number of channels used for the distributed allocation method and the number of channels used for the localized allocation method must be recognized, such that the predefined partitioning pattern must be properly adjusted according to the recognized result.

In this way, characteristics of Tx data are changed with time. If the predefined partitioning pattern is adaptively adjusted according to this changed result, the system according to the present invention is able to acquire a gain in the aspects of resource use efficiency and a data transfer rate. For example, if the number of data channels, each of which needs a large bandwidth as in VoIP traffic without requesting stably-continuous connection, greatly increases, the use of the predefined partitioning pattern, which has a higher importance in the distributed method than the localized method, is more profitable. On the other hand, if the importance of traffic which momentarily requesting a large bandwidth greatly increases, the use of the predefined partitioning pattern which has a higher importance in the localized method than the distributed method is more preferable.

The predefined partitioning pattern and the channel condition are closely concerned with each other in light of available diversity acquisition. From the viewpoint of resource allocation aspects based on the distributed method, the use of a specific environment having a high channel-selectivity is more profitable. Therefore, under an environment having a high channel-selectivity based on time, the use of the predefined partitioning pattern on which information allocation based on the distributed method is implemented on a time axis is more profitable. On the other hand, under the environment having a high channel-selectivity on a frequency axis, the use of the predefined partitioning pattern on which information allocation based on the distributed method is implemented on the frequency axis may give a gain to a data transfer rate.

Figure 17:
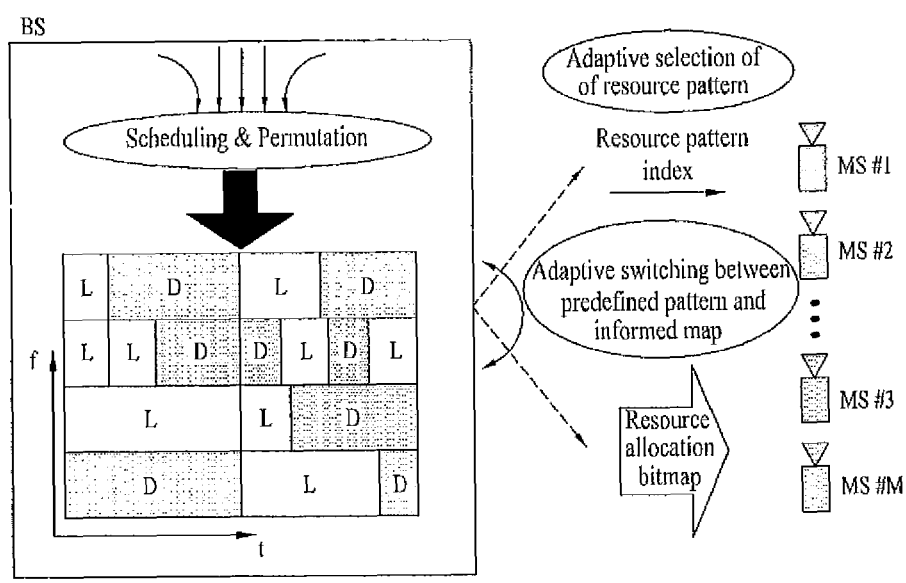
FIG. 17 is a conceptual diagram illustrating an adaptive resource partitioning method according to another embodiment of the present invention.

FIG. 17 shows the second case of the above-mentioned adaptive resource partitioning method. In other words, FIG. 17 is a flow chart illustrating an adaptive resource partitioning method according to another embodiment of the present invention.

FIG. 17 is a conceptual diagram illustrating an adaptive resource partitioning method according to another embodiment of the present invention.

An adaptive change method between a predefined pattern method and an informed map method among adaptive partitioning methods may include the following cases. Namely, the adaptive change method may include a method for changing the predefined pattern method and the informed map method according to the number of distributed and localized allocation channels, a method for changing the predefined pattern method and the informed map method according to characteristics of Tx data, a method for changing the predefined pattern method and the informed map method according to frequency-axis channel selectivity, and a method for changing the predefined pattern method and the informed map method according to time-axis channel selectivity.

The localized allocation method is able to select the best allocation area on the time or frequency axis. So, if the number of localized allocation areas currently used in the predefined pattern method is low, a multi-user diversity capable of being acquired is greatly reduced. Also, areas used for the distributed allocation may be frequently allocated simultaneously while sticking to each other, such that the system according to the present invention is unable to acquire an available diversity on a time or frequency axis.

Therefore, if the number of localized allocation areas is less than the number of distributed allocation areas, the information partitioning by the informed map method is more profitable than that of the predefined pattern method, although much additional information is generated by the informed map method. On the other hand, if the number of localized allocation areas is higher than the number of distributed allocation areas, localized allocation areas may be successively concatenated in most cases, and distributed allocation areas may be separated from other in most cases, such that the system according to the present invention can acquire enough diversity although it does not use resource areas using the informed map method. In this case, the use of the predefined pattern method is more profitable than that of the informed map method.

Another method according to another embodiment of the present may include a method for adaptively changing the selection between the predefined pattern method and the informed map method according to the number of distributed allocation areas and the number of localized allocation areas.

In the meantime, the predefined pattern method and the informed map method may also be adaptively changed to others according to traffic types of Tx data. Provided that channels having continuous traffic characteristics are mainly used in the same manner as in a VoIP, the use of the partitioning pattern based on the distributed allocation method according to the predefined pattern method is more advantageous to reduction of an amount of control information. If traffic characteristics are quickly changed in various ways, the use of a method for establishing the allocation area using the informed map method is more profitable in light of a data transfer rate although the amount of control information is consumed.

Finally, if a condition of a transport channel is abruptly changed with time, the informed map method is more profitable. On the contrary, if a condition of the transport channel is abruptly changed on a frequency axis whereas the transport channel is not excessively changed with time, the predefined pattern method is needed to reduce the amount of control information.

Therefore, the adaptive resource partitioning method according to another embodiment of the present invention may include a method for selecting either of the predefined pattern method and the informed map method according to any one of the number of channels used for resource allocation, data characteristics, and a channel environment variation.

As apparent from the above description, the present invention effectively obtains a diversity and a scheduling gain when distributed resource allocation and localized resource allocation are simultaneously used, such that it increases flexibility of resource allocation, increases an available data transfer rate, and reduces an amount of necessary control information, such that it can be applied to not only a variety of devices (e.g., a base station and a terminal) associated with an OFDM system, but also their associated algorithm.

Although the present invention has been disclosed by referring to the above-mentioned embodiments, it should be noted that the aforementioned embodiments have been disclosed for only illustrative purposes, and those skilled in the art will appreciate that various modifications, additions and substitutions are possible, without departing from the scope and spirit of the invention as disclosed in the accompanying claims. Thus, it is intended that the present invention covers the modifications and variations of this invention provided they come within the scope of the appended claims and their equivalents.

What is claimed is:

1. A method for adaptively partitioning resources for use in a localized allocation of resources and a distributed allocation of resources in a downlink transmission system based on an orthogonal frequency division multiple access (OFDMA), the method comprising:

selecting either a predefined pattern scheme or an informed map scheme according to at least one of a number of channels used for resource allocation, a data characteristic, and a channel environment variation;

if the predefined pattern scheme is selected, selecting a pattern of plural predefined patterns, partitioning a scheduling area into a distributed resource allocation area and a localized resource allocation area according to the selected pattern, and transmitting a pattern index of the selected pattern to a terminal, wherein the localized resource allocation area is defined as at least one resource block where the localized allocation is used and the distributed resource allocation area is defined as at least one resource block where the distributed allocation is used, wherein the pattern index comprises a ratio of a number of blocks arranged sequentially among the localized resource allocation area to a number of blocks arranged sequentially among the distributed resource allocation area; and if the informed map scheme is selected, partitioning the scheduling area into the distributed resource allocation area and the localized resource allocation area according to an arbitrary pattern, and transmitting bitmap control information indicating information of the partitioned areas to the terminal.

2. The method according to claim 1, wherein the predefined pattern scheme or the information map scheme is selected according to a number of channels used for the localized allocation and a number of channels used for the distributed allocation.

3. The method according to claim 1, wherein the predefined pattern scheme or the information map scheme is selected according to a bandwidth requested, by data to be transmitted, and a connection persistency.

4. The method according to claim 1, wherein the predefined pattern scheme or the information map scheme is selected according to a channel selectivity on a time axis and a channel selectivity on a frequency axis.

5. The method according to claim 1, wherein the plural predefined patterns include an order of time where at least one frequency-axis pattern based on the ratio is arranged on a time axis.

6. The method according to claim 1, wherein the predefined pattern scheme or the information map scheme are adaptively changed from each other according to a portion of the distributed resource allocation area and the localized resource allocation area.

* * * * *